US012020921B2

(12) United States Patent
Jeong et al.

(10) Patent No.: US 12,020,921 B2
(45) Date of Patent: Jun. 25, 2024

(54) ULTRAVIOLET RAY EMITTING DEVICE

(71) Applicant: AweXome Ray, Inc., Anyang-si (KR)

(72) Inventors: Keun Soo Jeong, Seoul (KR); Young Bae Kim, Anyang-si (KR); Sang Hyuk Ha, Ansan-si (KR); Seung Woo Yi, Seoul (KR); Hong Soo Choi, Seoul (KR); Se Hoon Gihm, Seongnam-si (KR)

(73) Assignee: AweXome Ray, Inc., Anyang-si (KR)

( * ) Notice: Subject to any disclaimer, the term of this patent is extended or adjusted under 35 U.S.C. 154(b) by 0 days.

(21) Appl. No.: 18/148,067

(22) Filed: Dec. 29, 2022

(65) Prior Publication Data

US 2023/0215720 A1 Jul. 6, 2023

(30) Foreign Application Priority Data

Dec. 30, 2021 (KR) ........................ 10-2021-0192878

(51) Int. Cl.
*H01J 61/06* (2006.01)

(52) U.S. Cl.
CPC .................................... *H01J 61/06* (2013.01)

(58) Field of Classification Search
CPC ........ H01J 61/06; H01J 61/0672; H01J 61/16; H01J 61/0675
See application file for complete search history.

(56) References Cited

U.S. PATENT DOCUMENTS

| | | | |
|---|---|---|---|
| 6,091,190 A | 7/2000 | Chalamala et al. | |
| 2006/0214560 A1 | 9/2006 | Noguchi et al. | |
| 2007/0145878 A1* | 6/2007 | Liu | H01J 63/06 313/318.02 |
| 2008/0170982 A1 | 7/2008 | Zhang et al. | |
| 2009/0093181 A1 | 4/2009 | Jin et al. | |
| 2010/0231118 A1 | 9/2010 | Ohmi et al. | |
| 2019/0002283 A1 | 1/2019 | Zhang et al. | |
| 2020/0395508 A1 | 12/2020 | Lee et al. | |
| 2021/0027969 A1 | 1/2021 | Choi et al. | |

FOREIGN PATENT DOCUMENTS

| | | | |
|---|---|---|---|
| CN | 103400919 B * | 5/2017 | H01L 33/40 |
| GB | 2492854 A | 1/2013 | |
| JP | 2005353598 A | 12/2005 | |
| KR | 20000068641 A | 11/2000 | |
| KR | 20020007023 A | 1/2002 | |

(Continued)

OTHER PUBLICATIONS

English Machine Translation of Kim et al, KR 102027407 (Year: 2023).*

(Continued)

*Primary Examiner* — Donald L Raleigh
(74) *Attorney, Agent, or Firm* — Seed IP Law Group LLP

(57) ABSTRACT

An ultraviolet emitting device according to the present disclosure includes a lamp for mounting a discharge gas and an ultraviolet emission source therein, and a plurality of yarns formed by extending and aggregating carbon nanotubes in a first direction, and includes a first electrode at least partially exposed to the discharge gas within the lamp. Accordingly, electron emission efficiency of the first electrode is improved to achieve high efficiency, and durability is also improved to provide a long-life device.

14 Claims, 7 Drawing Sheets

(56) References Cited

FOREIGN PATENT DOCUMENTS

| | | | | | |
|---|---|---|---|---|---|
| KR | 20050062111 | A | | 6/2005 | |
| KR | 20060035214 | A | | 4/2006 | |
| KR | 20060056871 | A | | 5/2006 | |
| KR | 20080009043 | A | | 1/2008 | |
| KR | 20080102698 | A | | 11/2008 | |
| KR | 20100058339 | A | | 6/2010 | |
| KR | 20100072181 | A | | 6/2010 | |
| KR | 20120048060 | A | | 5/2012 | |
| KR | 101162881 | B1 | | 7/2012 | |
| KR | 101206681 | B1 | | 12/2012 | |
| KR | 20130115399 | A | | 10/2013 | |
| KR | 20140022152 | A | | 2/2014 | |
| KR | 102006361 | B1 | | 8/2019 | |
| KR | 102027407 | B1 | * | 11/2019 | .............. H01J 1/304 |
| KR | 102099411 | B1 | | 4/2020 | |

OTHER PUBLICATIONS

English Machine Translation of Li et al CN 103400919 (Year: 2023).*

* cited by examiner

ULTRAVIOLET RAY EMITTING DEVICE

BACKGROUND

Technical Field

The present disclosure relates to an ultraviolet emitting device having high durability and improved ultraviolet emitting efficiency.

Description of the Related Art

Ultraviolet (UV) emitting devices are used in various fields such as process inspection, bioenvironmental chemical sensors, counterfeit identification of documents or banknotes, air purification, sterilization of drinking water or household items, medical care, and curing. In the related art, a mercury lamp has been mainly used as an ultraviolet emitting device, and a material that easily emits thermal electrons, such as valium oxide, strontium oxide, or calcium oxide, has been coated on tungsten filament coils located at both ends of a lamp containing a discharge gas such as mercury and argon gas, and has been used as an ultraviolet emitter. In a mercury lamp in the related art, electrons emitted from electrodes excite electrons in nearby mercury atoms, and UV is emitted as the excited electrons return to a ground state. However, since mercury lamps in the related art emit electrons in the manner of thermionic emission, a temperature of at least 1000° C. or higher is required. Therefore, since power is required to generate heat, high power is consumed, so the efficiency is very low, and it is difficult to start the mercury lamp immediately because it takes time to raise the temperature of the electrode to 1000° C. or higher. In addition, the life of the electrode is very short due to the high electrode temperature, impurities may be generated on the outer wall of the mercury lamp by reacting with surrounding materials, and there are also difficulties in that the outer wall is cracked due to the high temperature.

Meanwhile, in order to emit electrons using a field emission device, a field electron emission type UV emitter using a carbon nanotube CNT has been attempted. As an emitter material with excellent electron emission characteristics, carbon nanotubes have electrical conductivity equivalent to that of metal, and have excellent physical and chemical stability and mechanical strength, and based on a nanometer-level diameter and a large aspect ratio with a length of 1,000 times or more compared to this diameter, it is advantageous to emit electrons through the front end.

When an electric field is applied, carbon nanotubes may also emit electrons through the front end based on the electric field concentrated on it and its excellent electrical conductivity, and electrons may be easily emitted even at low electric fields, since the field enhancement factor required is very excellent at this time.

However, it is very difficult to apply carbon nanotubes to the process, so in the related art, carbon nanotube electrodes are manufactured using carbon nanotube pastes in which carbon nanotubes are adhered to external materials, or carbon nanotubes are directly grown on a substrate to produce electrodes, however, in this case, since the carbon nanotubes are not directly coupled to each other but formed in a separate form, there is a matter of showing low structural stability when applied to the field emission electrode of an ultraviolet emitting device.

BRIEF SUMMARY

Technical Goals

An aspect is providing an ultraviolet emitting device with high efficiency and long life.

Technical Solutions

According to an aspect, there is provided an ultraviolet emitting device which includes a lamp for mounting a discharge gas and an ultraviolet emission source therein; and a first electrode including a plurality of yarns formed by extending and aggregating carbon nanotubes in a first direction, at least a portion of which is exposed to the discharge gas within the lamp.

When power is supplied to the first electrode, electrons emitted from the first electrode may excite electrons in the ultraviolet emission source, and the excited electrons may emit ultraviolet while returning to a ground state.

In an aspect, the side portions of each of the yarns of the first electrode may be aligned side by side in the first direction, and the plurality of yarns may be aggregated with each other by Van der Waals force.

In an aspect, the first electrode may be a plurality of yarns twisted.

In an aspect, the first electrode may include a front end, a base end, and a surface extending between an edge of the front end and an edge of the base end, and the base end may be bent toward the front end.

In an aspect, at least a part of the front end and at least a part of the base end may contact each other or may not contact each other. The bent first electrode includes a first portion extending in a first direction and including the front end, a second portion extending in a direction opposite to the first direction and including the base end, and a third portion extending between the first portion and the second portion and bent with a predetermined curvature, and the first part and the second part may be twisted with each other around an axis parallel to the first direction.

In an aspect, the ultraviolet emitting device may include a second electrode connected to one side of the first electrode and a power source. The first electrode and the second electrode may be directly connected. The second electrode may include molybdenum.

The field emission device further includes a third electrode, one end of the third electrode is directly connected to at least a portion of the first electrode, the other end of the third electrode is directly connected to at least a portion of the second electrode, and the first electrode and the second electrode may not contact with each other. The third electrode may surround at least a portion of the first electrode.

The third electrode may include a strip-shaped front end, a strip-shaped base end, a first surface extending between an inner edge of the front end and an inner edge of the base end, and a second surface extending between an outer edge of the front end and an outer edge of the base end, wherein at least a part of the first electrode may be covered in an inner space defined by the first surface.

The first electrode and the second electrode may not contact each other, and the field emission device may further include a bridge electrode directly connected to the second electrode and the third electrode.

The bridge electrode may include a first bridge electrode having one end directly connected to the second electrode and the other end directly connected to the third electrode, a second bridge electrode spaced apart from the first bridge electrode at a predetermined distance and having one end directly connected to the second electrode and the other end directly connected to the third electrode, and a third bridge electrode extending between the first bridge electrode and the second bridge electrode and connecting the first bridge electrode and the second bridge electrode.

Effects

The present disclosure may provide a Long-life, high-efficiency ultraviolet emitting device with excellent UV emitting efficiency, less damage to the device, and reduced contact resistance, since it includes a field emission device including a first electrode in which a plurality of yarns formed by extending carbon nanotubes are aggregated.

DETAILED DESCRIPTION

Figure 1:
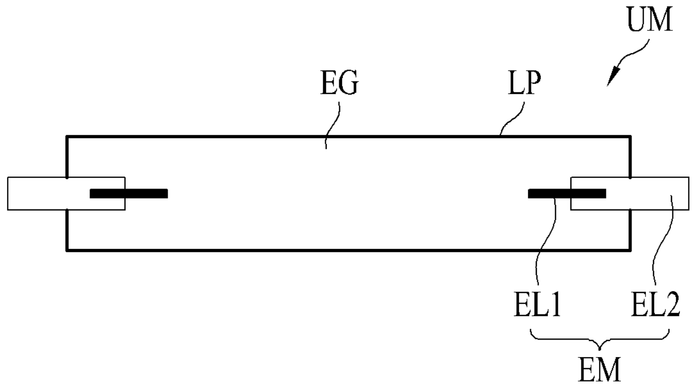
FIG. 1 is a cross-sectional view of an ultraviolet emitting device according to an example embodiment.

This research was a part of the project titled 'Development of Carbon Nanotube Based Energy-efficient and Long-lasting Optical Source for Seawater Sterilization Applications (1525011832),' funded by the Ministry of Oceans and Fisheries, Korea.

Prior to the detailed description of the present disclosure, the terms or words used in this specification and claims should not be construed as being limited to a common or dictionary meaning, and based on the principle that the inventor may appropriately define the concept of the term in order to explain his or her disclosure in the best way, it should be interpreted as meaning and concept consistent with the technical spirit of the present disclosure.

Since the following descriptions and configurations of the example embodiments described in this specification are only one of the most preferred embodiments of the present disclosure and do not represent all of the technical spirit of the present disclosure, it should be understood that there may be various equivalents and modifications that may replace them at the time of this application.

In this specification, when a component is referred to as being "connected" or "coupled" with another component, it means that it may be directly placed/connected/coupled onto other components or a third component may be placed between them. For example, that a first component is connected to a second component may mean that the first component and the second component are directly contacted and connected, or may be connected indirectly through a third component.

In this specification, when a component is referred to as being disposed "on" or "above" another component, it may mean that it is disposed "above" or "below" the other component. Same reference numerals designate same components. Also, in the drawings, the thickness, ratio, and dimensions of components are exaggerated for effective description of technical content.

In this specification, singular expressions include plural expressions unless the context clearly dictates otherwise. In this specification, it should be understood that the term "comprising" is intended to indicate that there is an embodied feature, number, step, component, or combination thereof, but it does not preclude the possibility of the presence or addition of one or more other features, numbers, steps, components, or combinations thereof.

Terms such as first and second may be used to describe various components, but the components should not be limited by the terms. These terms are only used for the purpose of distinguishing one component from another. For example, a first component may be termed a second component, and similarly, a second component may also be termed a first component, without departing from the scope of the present disclosure.

Singular expressions include plural expressions unless the context clearly dictates otherwise.

As used herein, the term "aggregation" may be used interchangeably with "set, assemblage, and bonding" within the present specification, and it may mean a form in which a plurality of carbon nanotubes is in close contact with each other as they interact by van der Waals force.

In the present specification, the term "yarn" refers to both carbon nanotubes formed by growing into a fiber form or formed by aggregating and/or fusing a plurality of carbon nanotubes into a fiber form.

In this specification, the term "and/or" is used to refer to any combination of components derived from one or more of the listed components.

In this specification, the term "same" may be understood as a term including cases in which there are only typical and subtle differences that may occur for various reasons such as processes in the art.

In this specification, the "base end" may mean one end of an object or a direction toward that end with respect to an arbitrary reference direction, and the "front end" may mean one end or a direction toward the other end with respect to the arbitrary reference direction. In this case, the base end may include any one end or distal end and/or area very close to the end face constituting an object, and "front end" may include an end opposite to the base end, a distal end, and/or an area very close to the end to distal end. These base end and front end may be recognized as a pair of concepts, and may be distinguished from other ends, distal end, and/or parts very close to the end to distal end.

Hereinafter, an ultraviolet emitting device according to an example embodiment of the present disclosure will be described with reference to the drawings.

Figure 2:
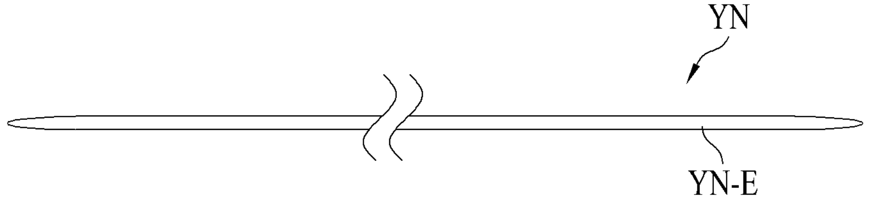
FIG. 2 is an enlarged view illustrating a carbon nanotube yarn according to an example embodiment.

FIG. 1 is a cross-sectional view of an ultraviolet emitting device according to an example embodiment. FIG. 2 is an enlarged view illustrating a carbon nanotube yarn according to an example embodiment.

Referring to FIG. 1, an ultraviolet emitting device UM according to an example embodiment may include a lamp LP and a field emission device EM in which a discharge gas EG and an ultraviolet emission source are mounted therein.

The ultraviolet emitting device UM may include one or more lamps LP. When the ultraviolet emitting device UM includes two or more lamps LP, the plurality of lamps LP may be in contact with each other or spaced apart from each other.

An internal space in which the discharge gas EG and the ultraviolet emission source are mounted or sealed may be defined in the lamp LP. The discharge gas EG may be an inert gas or a gas with low reactivity, such as neon Ne, argon Ar, xenon Xe, krypton Kr, and nitrogen N2. The discharge gas EG may be filled in the lamp LP at a predetermined pressure, and the predetermined pressure may be variously determined depending on the use.

The lamp LP may include an ultraviolet emission source. The ultraviolet emission source may include, for example, mercury, where mercury may be included in a gaseous state.

The lamp LP may include a transparent or translucent material to transmit UV. For example, the lamp LP may include a material such as glass, metal, ceramic, and/or synthetic resin. For example, the lamp LP may be made of glass.

Field electrons emitted from the field emission device EM excite electrons in the ultraviolet emission source atoms, and UV emitted as the excited electrons return to a ground state may be emitted to the outside of the lamp LP.

An ultraviolet emitting device UM of one example embodiment may emit UVA of about 320 nanometers (nm) to 400 nm, UVB of about 280 nm to 320 nm, or UVC of about 200 nm to 280 nm. An ultraviolet emitting device according to an example embodiment may be used for various purposes such as medical care, sterilization, beauty care, and curing by emitting ultraviolet in various wavelength ranges. For example, when the ultraviolet emitting device UM contains mercury, it may emit ultraviolet having a central wavelength of about 250 nm to 260 nm, for example, ultraviolet having a central wavelength of about 254 nm, and it may be used for sterilization purposes.

The shape of the lamp LP is not particularly limited, and may be, for example, a pipe shape, a light bulb shape, or a plate shape.

Although not shown, the inside of the lamp LP may be coated or applied with a material commonly used in the art so as to effectively diffuse and/or transmit ultraviolet. In addition, the lamp LP of one example embodiment may further include a protective layer for protecting the lamp LP from damage of lamp LP caused by force generated by discharge.

Referring to FIG. 1, FIG. 2 and FIG. 3*a* to FIG. 3*d*, the field emission device EM may include a first electrode EL1 and a second electrode EL2.

The first electrode EL1 may include a plurality of yarns YN. The yarn YN may be formed by extending and aggregating carbon nanotubes CNTs in a first direction. The first electrode EL1 may include a plurality of yarns YN aggregated with each other. For example, a plurality of yarns YN may be aggregated by van der Waals forces (for example, hyperconjugation and pi-pi interactions) between adjacent yarns YN.

The field emission device EM may include a second electrode EL2. The second electrode EL2 is connected to one side of the first electrode EL1 and the power source. The first electrode EL1 and the second electrode EL2 may be directly contacted and connected, or may be indirectly connected by another component electrically connecting the first electrode EL1 and the second electrode EL2.

At least a portion of the first electrode EL1 may be exposed to the discharge gas EG within the lamp LP. When power is supplied to the first electrode EL1, electrons emitted from the first electrode EL1 may excite electrons in the discharge gas EG, and the excited electrons may emit ultraviolet while returning to a ground state.

In one example embodiment, a conductive adhesive, for example, a carbon nanotube paste and/or a solvent capable of enhancing van der Waals interactions is added between adjacent carbon nanotubes and/or between yarns YN to enhance the degree of cohesion by directly promoting adhesion of adjacent carbon nanotubes and/or yarns YN or by enhancing van der Waals interactions.

The solvent may be one or more organic solvents selected from the group consisting of ethanol, methanol, propanol, ketone (for example, acetone), xylene, chloroform, ethyl acetate, ether (for example, diethyl ether), polyethylene glycol, ethyl formate, mesitylene (1, 3, 5-trimethylbenzene), tetrahydrofuran, dimethylformamide, dichloromethane, hexane, heptane, octane, pentene, hexene, benzene, carbon tetrachloride, and toluene, but it is not limited to only these.

As in the prior art, when the emission electrode is made of tungsten W, in order to enlarge the surface area of the electrode, it was necessary to process it in the form of a coil, and the life of the coil was also very short. In addition, when the emission electrode is formed by using a carbon nanotube paste or by directly growing carbon nanotubes on a substrate, since the carbon nanotubes are formed in a separate form without being directly coupled to each other, when used as a field emission electrode, durability and efficiency are low due to low structural stability, and the use of additives that cause instability for electrode formation is essential.

In addition, when the emission electrode is made of tungsten, since thermal electron emission occurs from the electrode, the field emission device EM or the lamp LP may be damaged due to high heat.

Since the field emission device EM according to an example embodiment includes yarns YN formed by extending and aggregating carbon nanotubes, the first electrode EL1 may have a very large surface area. Therefore, more current may flow at the same voltage compared to other conductive materials, and the amount of allowable current may be increased. In addition, since resistance is reduced with a large surface area, a highly efficient field emission device EM may be achieved. In addition, since the use of additives is not essential and carbon nanotubes may be directly bonded to each other, structural stability is excellent. In addition, since the field emission device EM according to an example embodiment generates field electron emission rather than thermal electron emission, damage to the ultraviolet emitting device UM does not occur due to heat, and the ratio of the input electrical energy to be lost as heat is reduced, electron emission efficiency may be improved because the ratio of the input electrical energy to be lost as heat is low.

FIG. 3*a* to FIG. 3*d* are diagrams illustrating exemplary shapes of a first electrode according to an example embodiment.

Figure 3A:
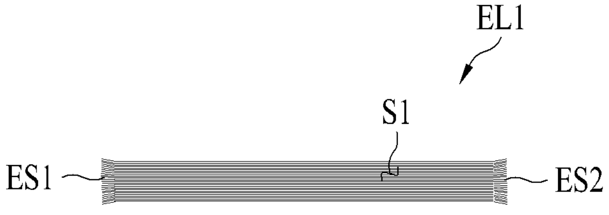
FIG. 3*a* to FIG. 3*d* are diagrams illustrating exemplary shapes of a first electrode according to an example embodiment.

Referring to FIG. 3*a*, the first electrode EL1 may be formed by aligning and aggregating the side portions YN-E of the plurality of yarns YN in a first direction. In FIG. 3*a*, only the first electrode EL1 is formed of one aggregate in which a plurality of yarns YN are aggregated, but a plurality of aggregates of a plurality of yarns YN may be included. In addition, when a plurality of such aggregates are included, the plurality of aggregates may exist twisted with each other. For example, the first electrode EL1 may include two aggregates, and the two aggregates may be twisted with each other.

Figure 3B:
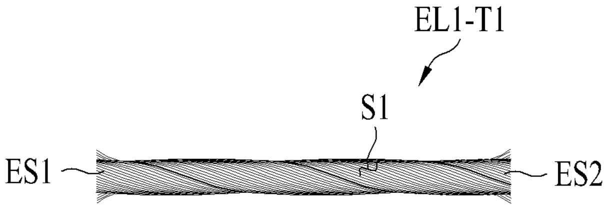

Referring to FIG. 3*b*, the first electrode EL1 may be formed by twisting a plurality of yarns YN. For example, the twisted first electrodes EL1-T1 shown in FIG. 3*b* may be formed by twisting the first electrode (EL1, FIG. 3*a*) formed by arranging and aggregating the side portions YN-E of the yarn YN in the first direction DR1, around the first axis.

Since the contact area between the yarns YN is widened, the twisted first electrode EL-T1 may have a larger van der Waals interaction, so that durability may be improved. In addition, since the surface area may be wider than when the yarns YN are aligned side by side, better efficiency may be exhibited.

Figure 3C:
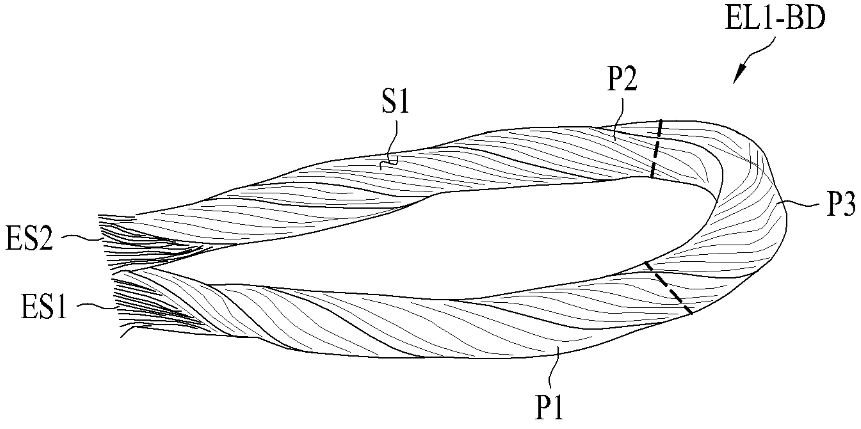
Figure 3D:
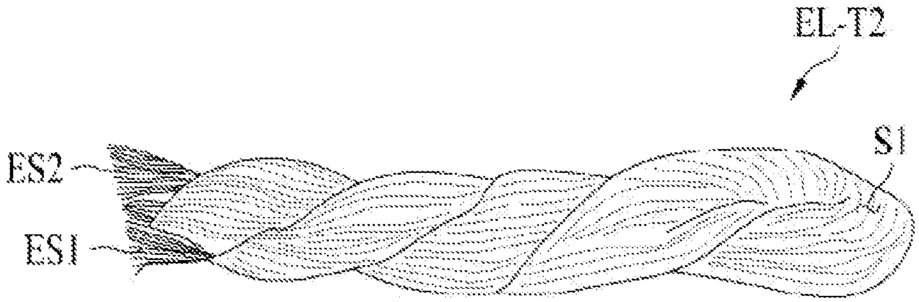

Referring to FIGS. 3*c* and 3*d*, the first electrode EL1 may include a front end ES1, a base end ES2, and a surface S1 extending between a corner of the front end ES1 and a corner of the base end ES2. The base end ES2 of the first electrode EL1 may be bent toward the front end ES1. When the first electrode EL1 has a bent shape, the front end ES1 and the base end ES2 may face the same direction. For example, at least a portion of the first electrode EL1-BD may be bent, and may have, for example, a ring shape. Although the twisted first electrode EL1-T1 is shown as being bent in FIG. 3*c*, it goes without saying that the first electrode EL1 in which the plurality of yarns YN are aligned side by side may also be bent.

Referring to FIG. 3*d*, the bent first electrode EL1-BD may include a first portion P1 extending in the first direction DR1 and including a front end ES1, a second portion P2 extending in a direction opposite to the first direction DR2 and including the base end ES2, and a third portion P3 extending between the first portion P1 and the second portion P2 and bent with a predetermined curvature. The first portion P1 and the second portion P2 may be twisted around an axis parallel to the first direction DR1 to form the bent and twisted first electrodes EL1-T2.

When the first electrode EL1 is bent or twisted, the surface area may be wider, so better field emission efficiency may be achieved.

Meanwhile, in order to increase the process efficiency of manufacturing the first electrode EL1, the carbon nanotubes are elongated in the first direction DR1 to form the yarn YN, and after aligning the formed plurality of yarns YN, it may be used by cutting to the required length. In this case, the force applied when cutting the yarn YN may be greater than the van der Waals force acting between the plurality of yarns YN, and thus deformation such as disaggregation of yarns YN adjacent to the cut surface may occur.

In addition, when the yarn YN is not bent, electrons may be accumulated in the front end ES1 or the base end ES2, which are both ends of the yarn YN. A repulsive force may occur between the accumulated electrons, and at this time, a repulsive force may also act between the yarns YN. If this repulsive force exceeds the cohesive force due to the van der Waals interaction between the yarns YN, the cohesion of the yarns YN may be released and, especially, in a region adjacent to the front end ES1 or the base end ES2, a plurality of yarns YN may be spaced apart from each other by repulsive force and widen deformation may appear.

When the front end ES1 or the base end ES2 is deformed, the field emission efficiency of the first electrode EL1 is reduced, and in the end, the function may be deteriorated or lost due to complete separation of the plurality of yarns YN.

However, in the bent first electrode EL1-BD or the bent and twisted first electrode EL1-T2 according to an example embodiment, since both the front end ES1 and the base end ES2 are directly or indirectly connected to a second electrode EL2 or a bridge electrode BG (see FIG. 5), which will be described later, there is little fear that the aggregation of the front end ES1 or base end ES2 of the yarn YN may be released. In addition, since the third portion P3 of the bent first electrode EL1-BD does not have a cut surface, there is little fear that the aggregation of the yarn YN is released even when electrons are accumulated. Accordingly, the bent first electrode EL1-BD according to an example embodiment may achieve a long lifespan. However, this describes an example embodiment of one aspect of the present disclosure, and, it goes without saying that the first electrode EL1 formed by aligning the yarns YN1 side by side and the first electrodes EL1-T1 formed by twisting the aligned yarns YN also have durability suitable for application to an ultraviolet emitting device UM. Although the first electrode EL1 having various shapes has been exemplarily described through FIG. 3*a* to FIG. 3*d*, the shape of the first electrode EL1 may have various structures in the present disclosure as well.

The second electrode EL2 may be a power supply electrode supplying current to the first electrode EL1. The second electrode EL2 may be an electrode directly connected to a power source. The second electrode EL2 may include a conductive material, and may include, for example, molybdenum Mo. The second electrode EL2 may contain at least 50 wt % or more, 60 wt % or more, 70 wt % or more, 80 wt % or more, 85 wt % or more, 90 wt % or more, 95 wt % or more, 97 wt % or more, 99 wt %, 99.5 wt % or more, or 99.9 wt % or more of molybdenum based on the total weight of the second electrode EL2.

Figure 4:
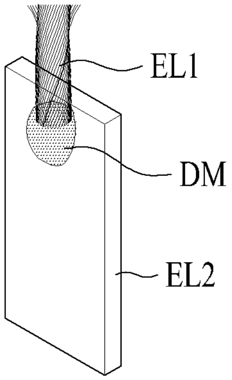
FIG. 4 is a diagram illustrating a field emission device according to an example embodiment.

FIG. 4 is a diagram illustrating a field emission device according to an example embodiment. Referring to FIG. 4, the first electrode EL1 may directly contact and be electrically connected to the second electrode EL2. The first electrode EL1 and the second electrode EL2 may be bonded using a separate adhesive member DM. The adhesive member DM may include a conductive material such as a conductive metal.

For example, the front end ES1 of the first electrode EL1 and a portion adjacent thereto may contact the second electrode EL2. In the case of the bent first electrodes EL1-BD and EL1-T2, the front end ES1 and a portion adjacent thereto may contact the second electrode EL2, and the front end ES1, the base end ES2 and a portion adjacent thereto may contact the second electrode EL2. The front end ES1, the base end ES2, and a portion adjacent thereto may or may not contact each other.

When tungsten is used as an electrode, defects may occur during sealing processes of the lamp through heating, compression, and cooling due to a difference in thermal expansion coefficient between the lamp LP and tungsten in the manufacturing process of the ultraviolet emitting device UM. For example, when the lamp LP is made of glass containing silicon oxide, defects may increase during the process due to a difference in coefficient of thermal expansion with that of tungsten. Therefore, when using a tungsten electrode to reduce the defect rate, it is essential to connect the tungsten electrode and the power supply electrode using a separate auxiliary electrode (for example, a nickel electrode). However, since the first electrode EL1 of an example embodiment includes the carbon nanotube yarn YN, the occurrence of the above matter is reduced, and the first electrode EL1 may directly contact and be electrically connected to the second electrode EL2. Accordingly, since a separate auxiliary electrode is not necessary, manufacturing time and cost of the field emission device EM may be reduced.

Figure 5:
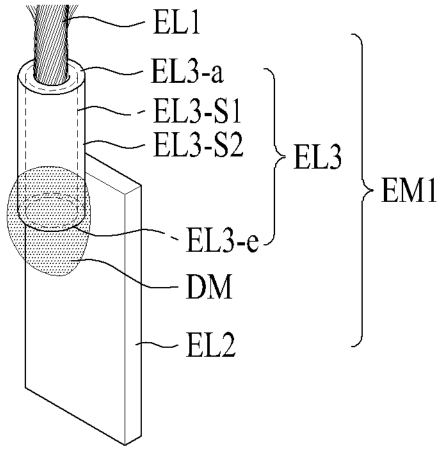
FIG. 5 is a diagram illustrating a field emission device according to an example embodiment.
Figure 6:
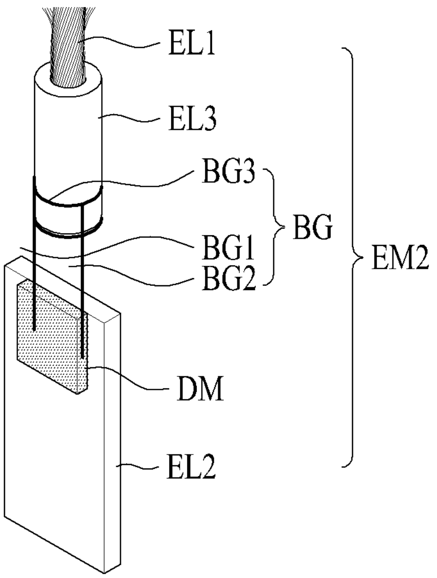
FIG. 6 is a diagram illustrating a field emission device according to an example embodiment.

FIG. 5 is a diagram illustrating a field emission device according to an example embodiment. FIG. 6 is a diagram illustrating a field emission device according to an example embodiment.

Referring to FIG. 5, the field emission device EM may further include a third electrode EL3. The third electrode EL3 may electrically connect the first electrode EL1 and the second electrode EL2. One end of the third electrode EL3 may be directly connected to at least a portion of the first electrode EL1, and the other end of the third electrode EL3 may be directly connected to at least a portion of the second electrode EL2. At this time, the first electrode EL1 and the second electrode EL2 may be non-contacting.

The third electrode EL3 may include a metal having high conductivity and good electrical conductivity. For example, the third electrode EL3 may include copper or a copper alloy (for example, brass or bronze). When the highly conductive third electrode EL3 is included, contact resistance between the first electrode EL1 and the second electrode EL2 may be reduced, and thus high current efficiency may be exhibited.

The third electrode EL3 may cover at least a portion of the first electrode EL1. The third electrode EL3 may include a stripe-shaped front end EL3-A, a stripe-shaped base end EL3-E, a first surface EL3-S1 extending between the inner edge of the front end EL3-A and the inner edge of the base end EL3-E, and a second surface EL3-S2 extending between the outer edge of the front end EL3-A and the outer edge of the base end EL3-E, wherein at least a portion of the first electrode EL1 may be covered in an inner space defined by the first surface EL3-S1.

For example, the first electrode EL1 adjacent to the second electrode EL2 may be covered by the third electrode EL3, and the remaining portion not adjacent to the second electrode EL2 may be exposed from the third electrode EL3. The third electrode EL3 may cover 1 to 80%, 1 to 70%, 1 to 60%, 1 to 50%, and 1 to 40%, 1 to 30%, 1 to 20%, 1 to 10%, 1 to 5%, 5 to 30%, 5 to 20%, 5 to 15% or 5 to 10% of the area of the first electrode EL1 based on the total area of the first electrode EL1.

The third electrode EL3 may cover the first electrode EL1 while exposing at least a portion of the first electrode EL1. For example, an end of the first electrode EL1 may be exposed from the third electrode EL3 to supply electrons to the discharge gas EG.

For example, the first electrode EL1, EL1-T1, EL1-T2 and EL1-BD having various shapes may have ends exposed from the third electrode EL3. For example, in the case of the unbent first electrodes EL1 and EL1-T1, the base end ES2 of the first electrode EL1 and a portion adjacent thereto may be exposed from the third electrode EL3. In the case of the bent first electrodes EL1-BD and EL1-T2, the third portion P3 and the portion adjacent to the third portion P3 (for example, the first portion P1 adjacent to the third portion P3 and a part of the second portion P2) may be exposed from the third electrode EL3.

The first electrode EL1 and the third electrode EL2 may simply contact each other without a separate adhesive or may be contacted using a conductive adhesive member DM.

The third electrode EL3 may be directly connected to the second electrode EL2. The third electrode EL3 and the second electrode EL2 may be bonded using a separate adhesive member DM. The adhesive member DM may be a conductive material. When the third electrode EL3 and the second electrode EL2 are directly connected, the contact portion of the third electrode EL3 and the second electrode EL2 may be bonded by an adhesive member DM containing a conductive metal.

As electrons are continuously emitted from the first electrode EL1, the repulsive force of the electrons may be accumulated in the first electrode EL1. In one example embodiment, since the third electrode EL3 covers at least a portion of the first electrode EL1, the accumulated repulsive force may prevent the yarns YN included in the first electrode EL1 from disaggregating. Therefore, since deformation of the first electrode EL1 may be prevented or delayed, the field emission device EM may be used with high efficiency for a long period of time.

Referring to FIG. 6, the second electrode EL2 and the third electrode EL3 may non-contact. The field emission device EM2 may further include a bridge electrode BG. The bridge electrode BG may be directly connected to the second electrode EL2 and the third electrode EL3. One end of the bridge electrode BG may be directly connected to the second electrode EL2 and the other end may be directly connected to the third electrode EL3.

The bridge electrode BG includes a conductive metal. For example, the bridge electrode BG may include nickel or molybdenum.

The bridge electrode BG may include a first bridge electrode BG1 having one end directly connected to the second electrode EL2 and the other end directly connected to the third electrode EL3; a second bridge electrode BG2 spaced apart from the first bridge electrode BG1 by a predetermined distance, one end directly connected to the second electrode EL2 and the other end directly connected to the third electrode EL3; and a third bridge electrode BG3 extending between the first bridge electrode BG1 and the second bridge electrode BG2 and connecting the first bridge electrode BG1 and the second bridge electrode BG2.

The third bridge electrode BG3 may be disposed on the third electrode EL3. The third bridge electrode BG3 may be directly disposed on the third electrode EL3. The bridge electrode BG may include one or two or more third bridge electrodes BG3, and may include two third bridge electrodes BG3 as shown. When the bridge electrode BG includes three or more third bridge electrodes BG3, the plurality of third bridge electrodes BG3 may be spaced apart at regular or irregular intervals.

In the field emission device EM2, the third electrode EL3 and the bridge electrode BG may be bonded using a separate adhesive member DM.

Hereinafter, a method of manufacturing an ultraviolet emitting device UM will be described based on the foregoing. The order of description of the method of manufacturing the ultraviolet emitting device UM does not represent the actual order of the manufacturing method. The ultraviolet emitting device UM may be manufactured in the order described below, but it is understood that it may be manufactured in an order different from the order described below as well.

A method of manufacturing an ultraviolet emitting device UM may include preparing a field emission device EM. Preparing the field emission device EM may include preparing the first electrode EL1 and connecting the first electrode EL1 to the second electrode EL2. A method of manufacturing according to an example embodiment may include directly connecting the first electrode EL1 to the second electrode EL2.

The method of manufacturing according to an example embodiment may include connecting the first electrode EL1 and the third electrode EL3 and connecting the second electrode EL2 and the third electrode EL3. The connecting the first electrode EL1 and the third electrode EL3 may include mounting the first electrode EL1 in the inner space defined by the first surface EL3-S1 of the third electrode EL3, and bonding the first electrode EL1 and the third electrode EL3 by pressing the third electrode EL3.

The connecting the second electrode EL2 and the third electrode EL3 may include placing one end of the third electrode EL3 on the second electrode EL2 and then adhering it with an adhesive member DM.

In one example embodiment, the connecting the second electrode EL2 and the third electrode EL3 may include connecting one end of the bridge electrode BG to the second electrode EL2 and connecting the other end of the bridge electrode BG to the third electrode EL3. The connecting the other end of the bridge electrode BG to the second electrode EL2 may include placing the other end of the bridge electrode BG on the second electrode EL2 and then adhering it with an adhesive member DM.

The method of manufacturing the ultraviolet emitting device UM may include disposing the prepared field emission device EM inside the lamp LP. The placing the field emission device EM inside the lamp LP may include placing the field emission device EM inside the heated lamp LP and sealing the lamp LP by pressing and cooling.

Hereinafter, excellent effects of the ultraviolet emitting device according to the present disclosure will be described with reference to examples and drawings. These examples are only for illustrating the present disclosure, and it will be apparent to those skilled in the art that the scope of the present disclosure is not to be construed as being limited by these examples.

Example Embodiment 1

Figure 7:
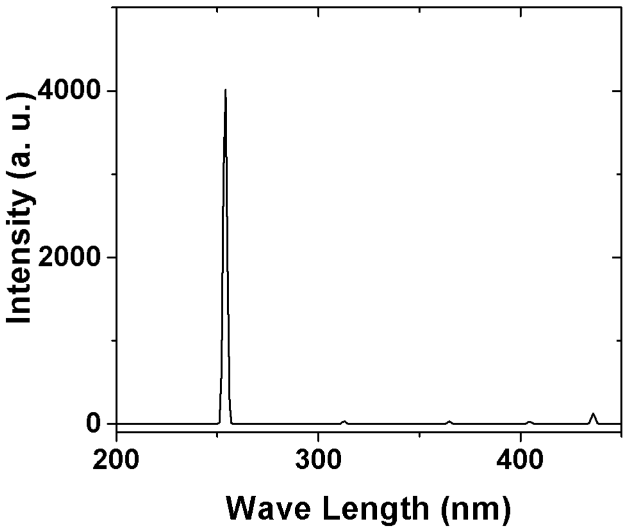
FIG. 7 is a diagram illustrating an emission wavelength and an emission intensity of an ultraviolet emitting device according to an example embodiment.

Operation of an Ultraviolet Emitting Device Containing Mercury and an Electrode Containing Carbon Nanotube Yarns The ultraviolet emitting device UM of Example embodiment 1 includes a first electrode EL1 including a yarn YN, and includes a discharge gas and mercury inside the lamp LP. Referring to FIG. 7, it is confirmed that the ultraviolet emitting device UM of Example embodiment 1 emits ultraviolet having a center wavelength of about 254 nm with high intensity.

Example Embodiment 2

Comparison of Effects of an Ultraviolet Emitting Device Including a Tungsten Electrode and an Electrode Containing Carbon Nanotube Yarn The ultraviolet emitting device UM of Example embodiment 2 was formed by manufacturing a yarn YN aggregate formed by aggregating a plurality of yarns YN long enough as a first electrode EL1, cutting and bending it, and then twisting them with each other (see FIG. 3*d*). An ultraviolet emitting device UM was prepared by forming a field emission device EM in the form shown in FIG. 5 using the formed first electrode EL1. An ultraviolet emitting device including a tungsten electrode used a tungsten electrode in the related art rather than an electrode including a carbon nanotube yarn. The UV emission intensity according to driving voltage, UV emission intensity and input power were measured and compared using the two devices.

Figure 8:
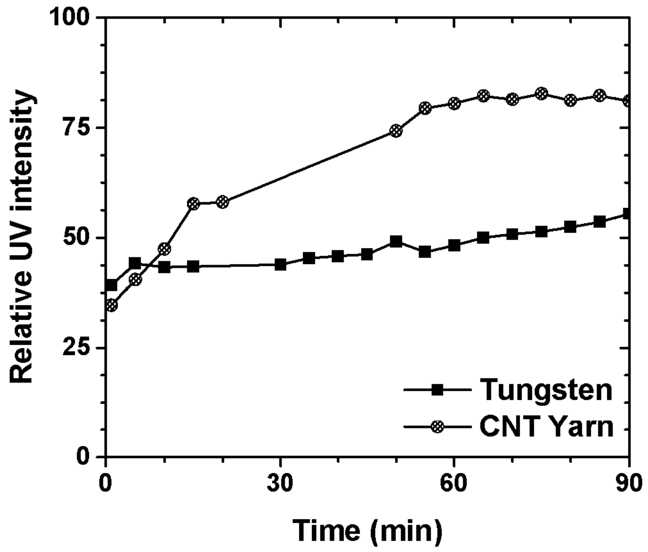
FIG. 8 is a graph showing UV emission intensity according to unit input power compared to a device using a tungsten electrode according to an example embodiment.

FIG. 8 is a graph showing UV emission intensity according to unit input power of an ultraviolet emitting device according to an example embodiment compared to a device using a tungsten electrode.

Referring to FIG. 8, it is confirmed that the ultraviolet emitting device UM according to an example embodiment has a higher relative UV emitting intensity than a device using a tungsten electrode in the related art, and therefore, the UV emitting efficiency is significantly higher. Specifically, it was confirmed that the ultraviolet emitting device UM of one example embodiment had a higher UV emission intensity compared to unit input power.

That is, it is confirmed that, compared to an ultraviolet emitting device in the related art using a tungsten electrode, the ultraviolet emitting device UM of Example embodiment 2 including the first electrode EL1 including carbon nanotube yarns YN has higher ultraviolet emission efficiency.

Example Embodiment 3

Comparison of Effects of Ultraviolet Emitting Device UM According to Shape of First Electrode EL1

An ultraviolet emitting device UM was prepared using the first electrode EL1 shown in FIG. 3*a*, FIG. 3*b*, and FIG. 3*c*, and UV emission intensity according to input power was measured.

Figure 9:
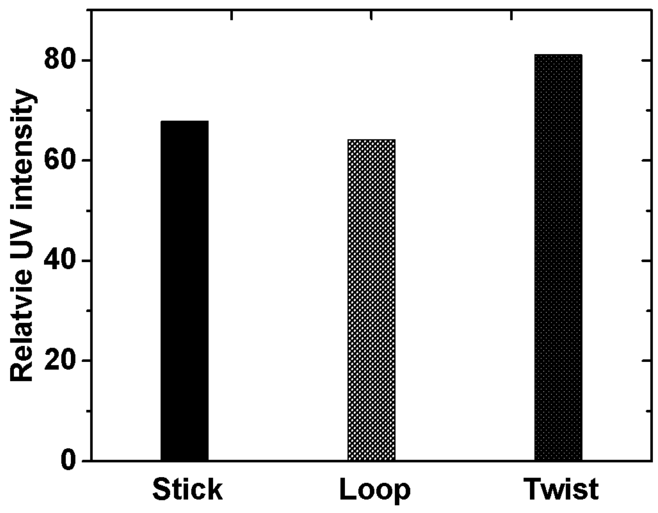
FIG. 9 is a graph showing driving voltage and UV emission intensity according to a shape of a first electrode of a field emission device according to an example embodiment.

FIG. 9 is a graph showing driving voltage and UV emission intensity according to a shape of a first electrode of a field emission device according to an example embodiment.

As shown in FIG. 9, when the bent first electrode EL1-BD is used, it is confirmed that the ultraviolet emission efficiency is the highest compared to the input power. Specifically, it is confirmed that when the bent first electrode EL1-BD is used, a higher emission efficiency of about 10 to 20% or more is achieved than when other types of electrodes are used, and this is considered to be because the surface area of the electrode is widened by using the electrode in a bent shape, thereby increasing the electron emission efficiency of the first electrode EL1.

Example Embodiment 4

Comparison of Shape of First Electrode Before and After Electron Emission

Figure 10:
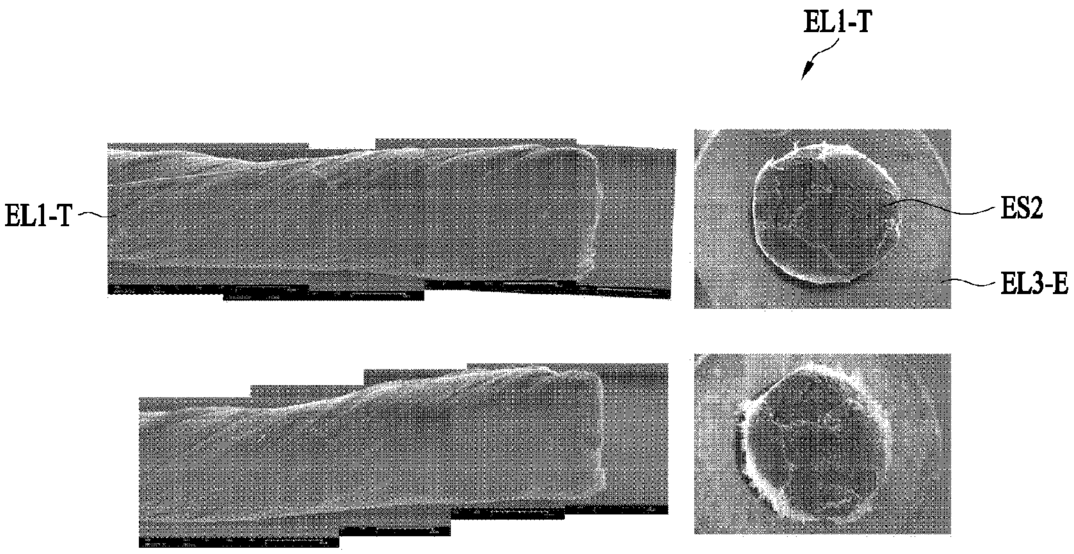
FIG. 10 is an enlarged view photographed with a scanning electron microscope and illustrating a shape of a first electrode before and after operation of a field emission device according to an example embodiment.

FIG. 10 is an enlarged view photographed with a scanning electron microscope and illustrating a shape of a first electrode before and after operation of a field emission device according to an example embodiment. The upper picture of FIG. 10 corresponds to a picture before operation and the picture below corresponds to a picture after operation. As shown, a portion of the first electrode EL1-T of FIG. 10 is covered by the third electrode EL3, and as shown in FIG. 5, is electrically connected with the second electrode EL2 through the third electrode EL3.

Figure 11:
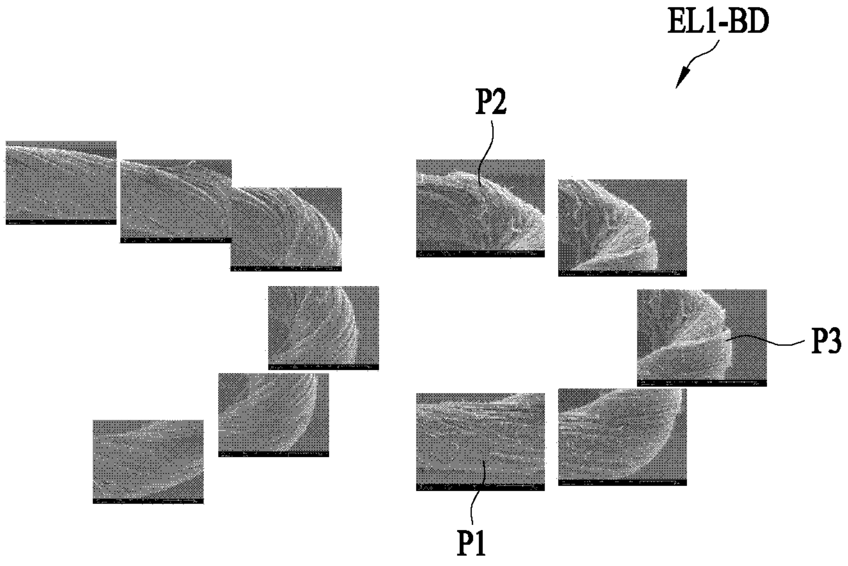
FIG. 11 is an enlarged view photographed using a scanning electron microscope and illustrating a shape of a first electrode before and after operation of a field emission device according to an example embodiment.

FIG. 11 is an enlarged view photographed using a scanning electron microscope and illustrating a shape of a first electrode before and after operation of a field emission device according to an example embodiment. The picture on the left of FIG. 11 corresponds to a picture before operation and the picture on the right corresponds to a picture after operation. Although not shown, the first electrodes EL1-BD of FIG. 11 are also covered by the third electrode EL3, and as shown in FIG. 5, is electrically connected with the second electrode EL2 through the third electrode EL3.

When electrons flow through the carbon nanotube yarn YN and the yarn is supplied in excess of the allowable amount, the electrode may be deteriorated. Therefore, it is considered that the portion shown to be deteriorated in the photograph after the field emission device EM is operated is the portion from which electrons are emitted. As shown in FIG. 10 and FIG. 11, in the first electrode EL1 according to an example embodiment, even if a portion of the electrode is deteriorated after electron emission, it is confirmed that the agglomeration of the yarn YN is not released, and the like does not occur. Rather, as only a portion of the yarn YN is damaged due to deterioration, a portion adjacent to the damaged portion is activated as an electron emission region, and emission efficiency may be further improved.

That is, the first electrode EL1 of one example embodiment may be used with high efficiency for a long period of time without release of the yarn YN even through continuous use.

Example Embodiment 5

Operation of an Ultraviolet Emitting Device

Figure 12:
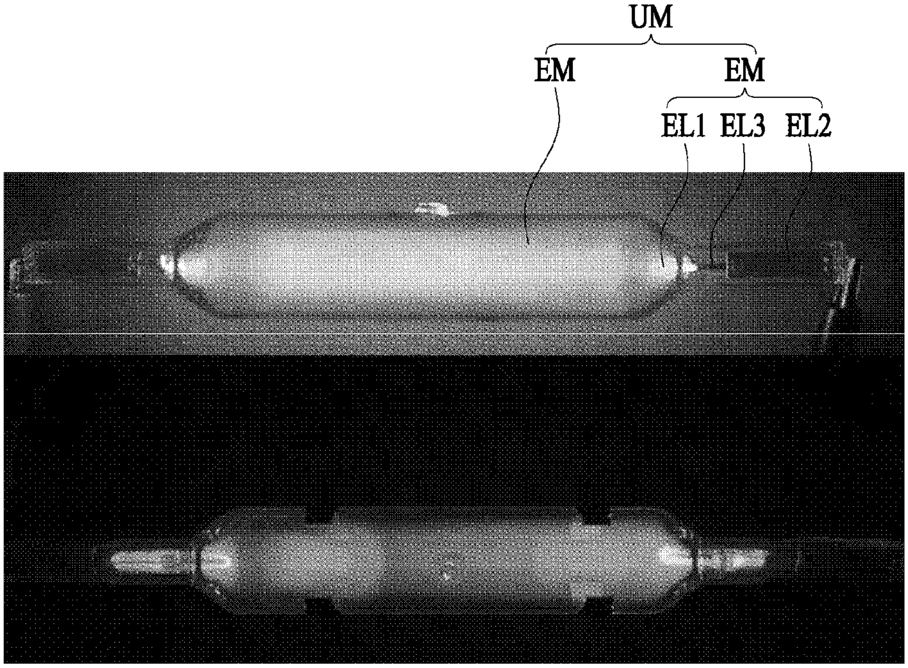
FIG. 12 is a diagram illustrating an operation of an ultraviolet emitting device according to an example embodiment.

FIG. 12 is a diagram illustrating an operation of an ultraviolet emitting device UM according to an example embodiment. As shown in FIG. 12, it is confirmed that the ultraviolet emitting device UM according to an example embodiment is operated to emit ultraviolet to the outside.

EXPLANATION OF REFERENCE

UM: Ultraviolet emitting device
EM: Field emission device
YN: Yarn
EL1: First electrode
EL2: Second electrode
EL3: Third electrode
BG: Bridge electrode
LP: Lamp The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An ultraviolet emitting device, comprising:
a lamp in which a discharge gas and an ultraviolet emission source are mounted therein; and
a first electrode including a plurality of yarns formed by extending and aggregating carbon nanotubes in a first direction and at least a portion of which is exposed to the discharge gas within the lamp.

2. The ultraviolet emitting device of claim 1, wherein, when power is supplied to the first electrode, electrons emitted from the first electrode excite electrons in the ultraviolet emission source, and the excited electrons emit ultraviolet while returning to a ground state.

3. The ultraviolet emitting device of claim 1, wherein, in the first electrode, the side portions of each of the yarns are aligned side by side in the first direction, and the plurality of yarns are aggregated with each other by van der Waals force.

4. The ultraviolet emitting device of claim 1, wherein the first electrode is a plurality of yarns twisted.

5. The ultraviolet emitting device of claim 1, wherein the first electrode includes a front end, a base end, and a surface extending between an edge of the front end and an edge of the base end, and
the base end is bent toward the front end.

6. The ultraviolet emitting device of claim 5, wherein the bent first electrode includes a first portion extending in a first direction and including the front end, a second portion extending in a direction opposite to the first direction and including the base end, and a third portion extending between the first portion and the second portion and bent with a predetermined curvature, and
the first portion and the second portion are twisted with each other about an axis parallel to the first direction.

7. The ultraviolet emitting device of claim 1, comprising:
a second electrode connected to one side of the first electrode and a power source.

8. The ultraviolet emitting device of claim 7, wherein the first electrode and the second electrode are directly connected.

9. The ultraviolet emitting device of claim 7, wherein the second electrode includes molybdenum.

10. The ultraviolet emitting device of claim 7, further comprising:
a third electrode,
wherein one end of the third electrode is directly connected to at least a portion of the first electrode, and the other end of the third electrode is directly connected to at least a portion of the second electrode; and
the first electrode and the second electrode do not contact each other.

11. The ultraviolet emitting device of claim 10, wherein the third electrode covers at least a portion of the first electrode.

12. The ultraviolet emitting device of claim 10, wherein the third electrode includes a strip-shaped front end, a strip-shaped base end, a first surface extending between an inner edge of the front end and an inner edge of the base end, and a second surface extending between an outer edge of the front and an outer edge of the base end, and
at least a portion of the first electrode is covered in an inner space defined by the first surface.

13. The ultraviolet emitting device of claim 7, wherein the first electrode and the second electrode do not contact each other,
the ultraviolet emitting device further comprises:

a strip-shaped front end, a strip-shaped base end, a first surface extending between an inner edge of the front end and an inner edge of the base end, and a second surface extending between an outer edge of the front end and an outer edge of the base end, a third electrode covering at least a part of the first electrode in an inner space defined by the first surface; and a bridge electrode directly connected to the second electrode and the third electrode.

14. The ultraviolet emitting device of claim 13, wherein the bridge electrode comprises:

a first bridge electrode having one end directly connected to the second electrode and the other end directly connected to the third electrode;

a second bridge electrode spaced apart from the first bridge electrode at a predetermined distance, one end directly connected to the second electrode and the other end directly connected to the third electrode; and a third bridge electrode extending between the first bridge electrode and the second bridge electrode to connect the first bridge electrode and the second bridge electrode.

* * * * *